United States Patent
Qin

(10) Patent No.: US 10,831,524 B2
(45) Date of Patent: Nov. 10, 2020

(54) VIRTUAL HOST MIGRATION SYSTEM AND METHOD, COMPUTER APPARATUS AND COMPUTER READABLE STORAGE MEDIUM

(71) Applicant: BOE TECHNOLOGY GROUP CO., LTD., Beijing (CN)

(72) Inventor: Shubo Qin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 92 days.

(21) Appl. No.: 16/199,003

(22) Filed: Nov. 23, 2018

(65) Prior Publication Data

US 2019/0213030 A1    Jul. 11, 2019

(30) Foreign Application Priority Data

Jan. 5, 2018 (CN) .......................... 2018 1 0011744

(51) Int. Cl.
G06F 9/455 (2018.01)
G06F 9/50 (2006.01)
G06F 9/445 (2018.01)

(52) U.S. Cl.
CPC ...... *G06F 9/45558* (2013.01); *G06F 9/44505* (2013.01); *G06F 9/5011* (2013.01);
(Continued)

(58) Field of Classification Search
CPC ....... G06F 9/45558; G06F 2009/45579; G06F 9/44505; G06F 9/5011; G06F 2009/4557
See application file for complete search history.

(56) References Cited

U.S. PATENT DOCUMENTS 7,203,944 B1 * 4/2007 van Rietschote ... G06F 9/45533
718/1
9,047,113 B2 * 6/2015 Iwamatsu ........... G06F 9/45558
(Continued)

FOREIGN PATENT DOCUMENTS

| CN | 103064733 A | 4/2013 |
| CN | 105094964 A | 11/2015 |

(Continued)

OTHER PUBLICATIONS

First Office Action dated Apr. 27, 2020, for corresponding Chinese application 201810011744.1.

*Primary Examiner* — Wei Y Zhen
*Assistant Examiner* — Amir Soltanzadeh
(74) *Attorney, Agent, or Firm* — Nath, Goldberg & Meyer; Joshua B. Goldberg

(57) ABSTRACT

The present disclosure provides a virtual host migration system, a virtual host migration method, a computer apparatus and a readable storage medium. The system at least includes: a first operation environment device and a second operation environment device, the first operation environment device is loaded with a virtual host of a first virtual structure; the second operation environment device is configured to acquire a file container acceptable by the second operation environment device, and load a virtual host of a second virtual structure according to the file container. In the present disclosure, the first operation environment device is loaded with the virtual host of the first virtual structure, and the second operation environment device acquires the file container acceptable by the second operation environment device and loads the virtual host of the second virtual structure according to the file container, thereby realizing virtual host migration across platforms.

11 Claims, 3 Drawing Sheets

(52) U.S. Cl.
CPC ............... *G06F 2009/4557* (2013.01); *G06F 2009/45579* (2013.01)

(56) References Cited

U.S. PATENT DOCUMENTS

| | | | | |
|---|---|---|---|---|
| 9,552,233 B1* | 1/2017 | Tsirkin | ................... | G06F 9/5027 |
| 2009/0089781 A1* | 4/2009 | Shingai | ................ | G06F 9/5077 |
| | | | | 718/1 |
| 2012/0266171 A1* | 10/2012 | Byun | ................. | G06F 9/45558 |
| | | | | 718/1 |
| 2012/0278571 A1* | 11/2012 | Fleming | ................. | H04L 29/08 |
| | | | | 711/162 |
| 2013/0139154 A1* | 5/2013 | Shah | ................... | G06F 9/45558 |
| | | | | 718/1 |
| 2018/0173524 A1* | 6/2018 | Azagury | ................... | G06F 8/76 |
| 2018/0203719 A1 | 7/2018 | Zhang et al. | | |
| 2019/0138729 A1* | 5/2019 | Blundell | ................ | H04L 9/3234 |

FOREIGN PATENT DOCUMENTS

| | | | |
|---|---|---|---|
| CN | 105955805 | A | 9/2016 |
| CN | 106201702 | A | 12/2016 |
| CN | 106569876 | A | 4/2017 |
| CN | 106775928 | A | 5/2017 |
| CN | 107004032 | A | 8/2017 |
| KR | 20110071757 | A | 6/2011 |

\* cited by examiner

VIRTUAL HOST MIGRATION SYSTEM AND METHOD, COMPUTER APPARATUS AND COMPUTER READABLE STORAGE MEDIUM

CROSS-REFERENCE TO RELATED APPLICATIONS

The present application claims priority to Chinese Patent Application No. 201810011744.1 filed on Jan. 5, 2018, the disclosure of which is hereby incorporated by reference in its entirety.

TECHNICAL FIELD

The present disclosure relates to the field of virtual computing technology, and in particular, to a virtual host migration system, a virtual host migration method, a computer apparatus and a computer readable storage medium.

BACKGROUND

In order to reduce IT costs of an enterprise, currently, based on a same cloud platform, a virtual host can be migrated from a local storage to a shared storage, realizing virtual host migration across storages.

With the continuous development of enterprise business and the maturity of open source technology, in order to realize the independent controllability of the enterprise technology and reduce IT costs, the enterprise cloud platform is gradually migrated from commercial VMware platform to open source OpenStack platform.

SUMMARY

The present disclosure provides a virtual host migration system, including a first operation environment device and a second operation environment device, the first operation environment device is loaded with a virtual host of a first virtual structure, the second operation environment device is configured to acquire a file container acceptable by the second operation environment device, and load a virtual host of a second virtual structure according to the file container.

In some implementations, the virtual host migration system further including a migration device coupled to the first operation environment device and the second operation environment device, the first operation environment device is configured to transmit resources of the virtual host of the first virtual structure to the migration device, the migration device is configured to convert the resources of the virtual host of the first virtual structure into a file container acceptable by the second operation environment device, and migrate the file container acceptable by the second operation environment device to the second operation environment device.

In some implementations, the resources include a storage resource and a system resource, the file container includes a storage file container and a system file container, and the migration device includes a storage migration device and a system migration device, the storage migration device is further configured to convert the storage resource into a storage file container acceptable by the second operation environment device, and migrate the storage file container to the second operation environment device, the system migration device is configured to convert the system resource into a system file container acceptable by the second operation environment device, and migrate the system file container to the second operation environment device.

In some implementations, the first operation environment device is configured to transmit resources of the virtual host of the first virtual structure to the second operation environment device, and the second operation environment device is configured to convert the resources of the virtual host of the first virtual structure into a file container acceptable by the second operation environment device, and load the virtual host of the second virtual structure according to the file container.

In some implementations, the virtual host migration system further including a storage pool, the second operation environment device transmits the file container to the storage pool, the storage pool is configured to store the file container, the second operation environment device is further configured to export the file container from the storage pool.

In some implementations, the resources include a storage resource and a system resource, the file container including a storage file container and a system file container, the first operation environment device is configured to transmit the storage resource and the system resource to the second operation environment device, the second operation environment device is configured to convert the storage resource into a storage file container acceptable by the second operation environment device, and convert the system resource into a system file container acceptable by the second operation environment device.

In some implementations, the virtual host migration system further including a storage pool, the migration device is further configured to transmit the file container to the storage pool, the storage pool is configured to store the file container, and the second operation environment device is further configured to export the file container from the storage pool.

In some implementations, the second operation environment device includes a space pre-allocation component, the space pre-allocation component is configured to read a configuration file of the virtual host of the first virtual structure, create an empty storage corresponding to the configuration file in the virtual host of the second virtual structure, and replace the empty storage with the file container exported from the storage pool, so as to load the virtual host of the second virtual structure.

In some implementations, the virtual host migration system further including: a memory mapping device, which is configured to map a memory page of the virtual host of the first virtual structure into a memory of the virtual host of the second virtual structure.

In some implementations, the virtual host migration system further including a cache consistency maintenance device, which is configured to synchronize cache data generated by the first operation environment device in the migration process to the second operation environment device.

In some implementations, the virtual host is a virtual host running in a cloud environment, for example, a cloud server.

The present disclosure provides a virtual host migration method, which is based on a virtual host migration system, the virtual host migration system at least including a first operation environment device and a second operation environment device, the first operation environment device is loaded with a virtual host of a first virtual structure, the virtual host migration method includes: acquiring, by the second operation environment device, a file container acceptable by the second operation environment device;

loading, by the second operation environment device, a virtual host of a second virtual structure according to the file container.

In some implementations, the virtual host migration system further includes a migration device, and the step of acquiring, by the second operation environment device, the file container acceptable by the second operation environment device further includes: transmitting, by the first operation environment device, resources of the virtual host of the first virtual structure to the migration device; and converting, by the migration device, the resources of the virtual host of the first virtual structure into the file container acceptable by the second operation environment device, and migrating, by the migration device, the file container acceptable by the second operation environment device to the second operation environment device.

In some implementations, the step of acquiring, by the second operation environment device, the file container acceptable by the second operation environment device further includes: transmitting, by the first operation environment device, resources of the virtual host of the first virtual structure to the second operation environment device; and converting, by the second operation environment device, the resources of the virtual host of the first virtual structure into a file container acceptable by the second operation environment device.

In some implementations, the step of loading, by the second operation environment device, the virtual host of the second virtual structure according to the file container further includes: reading, by the second operation environment device, a configuration file of the virtual host of the first virtual structure; creating, by the second operation environment device, an empty storage corresponding to the configuration file in the virtual host of the second virtual structure; and replacing, by the second operation environment device, the empty storage with the file container so as to load the virtual host of the second virtual structure.

The present disclosure provides a computer apparatus including: at least one processor; a memory configured to store at least one program; the at least one program is executed by the at least one processor such that the at least one processor implement the above virtual host migration method.

The present disclosure provides a non-transitory computer readable storage medium storing computer instructions, the computer instructions are executed to perform the above virtual host migration method.

DETAILED DESCRIPTION

To enable a person skilled in the art to better understand the technical solutions of the present disclosure, the virtual host migration system, the virtual host migration method, the computer apparatus, and computer readable storage medium provided by the present disclosure are described in detail below with reference to the accompanying drawings.

A virtual host refers to a certain amount of disk space on a network server, which is allocated for renting by users to place sites and application components, thus providing necessary data storage and transmission functions.

Figure 1:
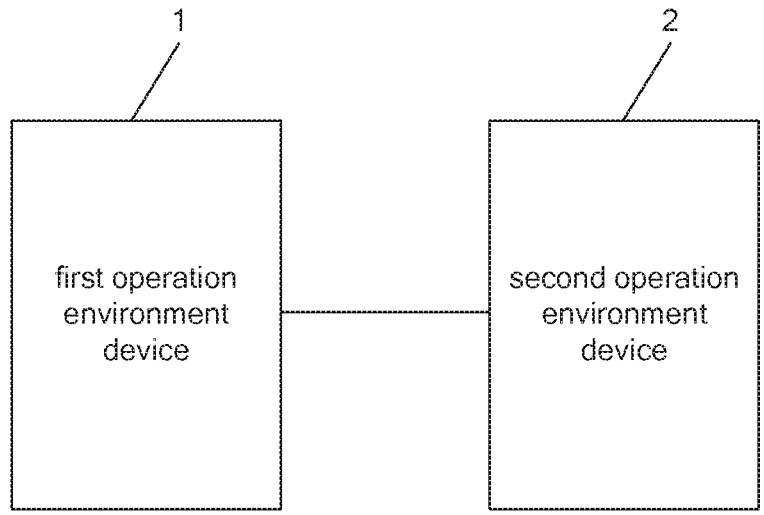
FIG. 1 is a schematic structural diagram of a virtual host migration system according to an embodiment of the present disclosure.

FIG. 1 is a schematic structural diagram of a virtual host migration system according to an embodiment of the present disclosure. As shown in FIG. 1, the virtual host migration system at least includes a first operation environment device 1 and a second operation environment device 2, the first operation environment device 1 is loaded with a virtual host of a first virtual structure. The second operation environment device 2 is configured to acquire a file container acceptable by the second operation environment device 2, and load a virtual host of a second virtual structure according to the file container.

In some implementations, the first operation environment device 1 may be, for example, ESXi or the like, and a correspondingly virtual host running therein may be VMware, the second operation environment device 2 may be, for example, OpenStack, and a correspondingly virtual host running therein may be Xen, KVM, or the like. Alternatively, the first operation environment device 1 may be, for example, OpenStack, and the correspondingly virtual host running therein may be Xen, KVM, or the like, the second operation environment device 2 may be, for example, ESXi or the like, and the correspondingly virtual host running therein may be VMware.

In the technical solution of the virtual host migration system provided in the present embodiment, the first operation environment device is loaded with the virtual host of the first virtual structure, and the second operation environment device acquires the file container acceptable by the second operation environment device and loads the virtual host of the second virtual structure according to the file container, which enables a migration of virtual host across platforms. The present disclosure can help enterprise users to realize business migration more quickly and respond to business needs in time.

Figure 2:
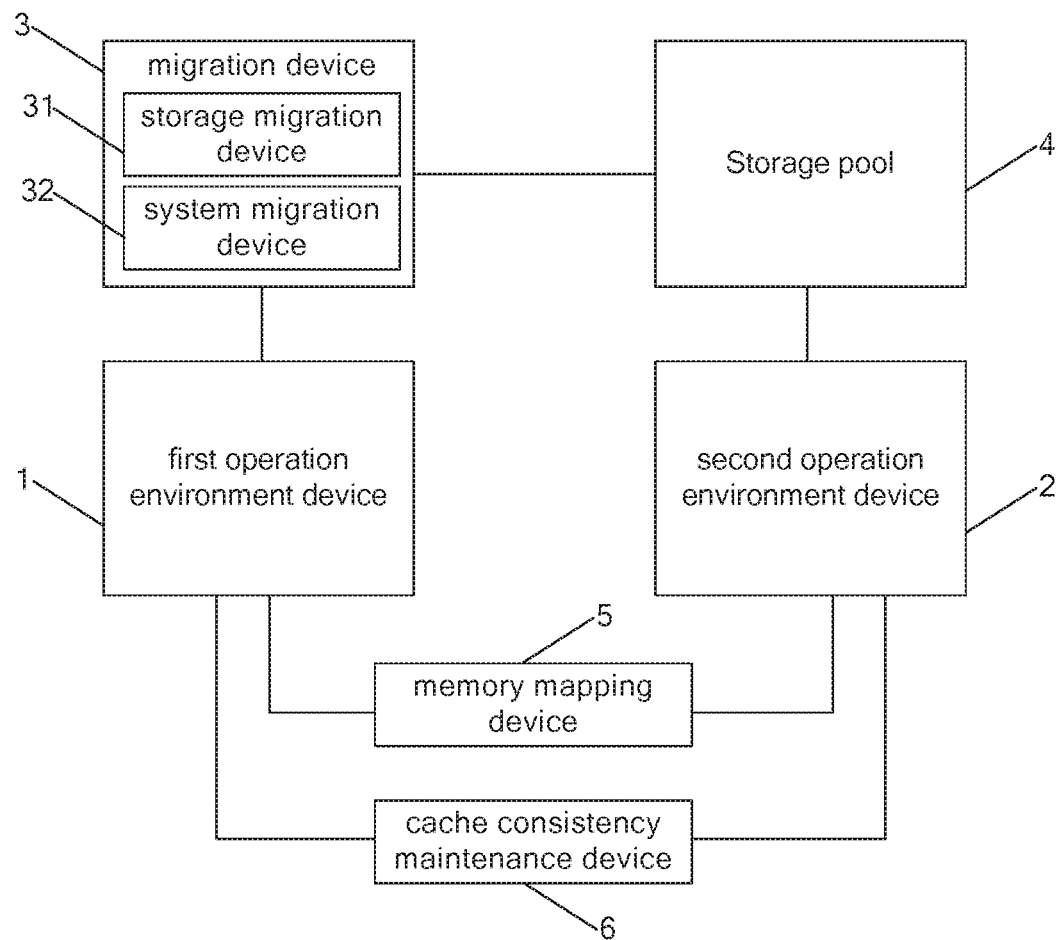
FIG. 2 is a schematic structural diagram of a virtual host migration system according to another embodiment of the present disclosure.

FIG. 2 is a schematic structural diagram of a virtual host migration system according to another embodiment of the present disclosure. As shown in FIG. 2, the virtual host migration system includes a first operation environment device 1, a second operation environment device 2, and a migration device 3 coupled to the first operation environment device 1 and the second operation environment device 2. The first operation environment device 1 is loaded with a virtual host of a first virtual structure. The first operation environment device 1 is configured to transmit resources of the virtual host of the first virtual structure to the migration device 3. The migration device 3 is configured to convert the resources of the virtual host of the first virtual structure into a file container acceptable by the second operation environment device 2, and migrate the file container acceptable by the second operation environment device 2 to the second operation environment device 2. The second operation environment device 2 loads the virtual host of a second virtual structure according to the file container.

In some implementations, the first operation environment device 1 and the second operation environment device 2 are different cloud platforms. For example, the first operation environment device 1 may be ESXi, and the second operation environment device 2 may be OpenStack. Accordingly, the virtual host of the first virtual structure may be VMware, and the virtual host of the second virtual structure may be Xen or KVM. Alternatively, the first operation environment device 1 may be OpenStack, and the second operation environment device 2 may be ESXi. Accordingly, the virtual host of the first virtual structure may be Xen or KVM, and the virtual host of the second virtual structure may be VMware.

In some implementations, the first operation environment device 1 is ESXi and the second operation environment device 2 is OpenStack. In this case, the resources of the virtual host of the first virtual structure may be a VMDK file, and a format of the file container acceptable by the second operation environment device 2 is RAW, and the file container is a RAW file.

In some implementations, the resources include a storage resource and a system resource, the file container includes a storage file container and a system file container, and the migration device 3 includes a storage migration device 31 and a system migration device 32. The storage migration device 31 is configured to convert the storage resource into a storage file container acceptable by the second operation environment device 2 and to migrate the storage file container to the second operation environment device 2. The system migration device 32 is configured to convert the system resource into a system file container acceptable by the second operation environment device 2 and to migrate the system file container to the second operation environment device 2.

In some implementations, the virtual host migration system further includes a storage pool 4. The migration device 3 is configured to transmit the file container to the storage pool 4. The storage pool 4 is configured to store the file container. The second operation environment device 2 is configured to export the file container from the storage pool 4 to realize migration of the file container to the second operation environment device 2. In some implementations, the storage pool 4 is a Ceph storage pool.

In some implementations, the second operation environment device 2 is configured to read a configuration file of the virtual host of the first virtual structure, create an empty storage corresponding to the configuration file in the virtual host of the second virtual structure, and replace the empty storage with the file container exported from the storage pool 4 to load the virtual host of the second virtual structure. Specifically, the second operation environment device 2 includes a space pre-allocation component (not specifically shown in the figure), and the space pre-allocation component is configured to read the configuration file of the virtual host of the first virtual structure, and create the empty storage corresponding to the configuration file in the virtual host of the second virtual structure, and replace the empty storage with the file container exported from the storage pool 4.

In some implementations, the virtual host migration system further includes a memory mapping device 5. The memory mapping device 5 is configured to map a memory page of the virtual host of the first virtual structure into a memory of the virtual host of the second virtual structure. During the migration process of the virtual host, the memory mapping device 5 can map the memory page of the virtual host of the first virtual structure into the memory of the virtual host of the second virtual structure in real time until the migration ends, thereby realizing migration of the virtual host without downtime. Since the mapping of the memory page is performed by the memory mapping device 5 isolated from the first operation environment device 1 and the second operation environment device 2, it is ensured that the user cannot perceive any interruption throughout the migration process.

In some implementations, the virtual host migration system further includes a cache consistency maintenance device 6. The cache consistency maintenance device 6 is configured to synchronize cache data generated by the first operation environment device 1 during the migration process into the second operation environment device 2. Since the synchronization of the cache data is performed by the cache consistency maintenance device 6 isolated from the first operation environment device 1 and the second operation environment device 2, it is ensured that the user cannot perceive any interruption throughout the migration process.

In some implementations, the first operation environment device 1 is further configured to de-characterize initial-resources of the virtual host of the first virtual structure to derive the resources. The initial-resources include a storage resource and a system resource, and the resources include a storage resource and a system resource, and the first operation environment device 1 de-characterizes the system resource of the initial-resources to derive the system resource in the resources, and in turn generates the resources based on the storage resource in the initial-resources and the system resource in the resources derived by above de-characterization. Specifically, the first operation environment device 1 may uninstall the driver file in the system resource of the initial-resources to implement de-characterization of the system resource of the initial-resources.

In some implementations, the virtual host is a virtual host running in a cloud environment.

The migration process of the virtual host will be described below by using a specific example. In this example, the first operation environment device 1 is ESXi, and the second operation environment device 2 is OpenStack. The resources of the virtual host of the first virtual structure may be the VMDK file, the file container acceptable by the second operation environment device 2 is a RAW file.

The first operation environment device 1 is logged in, the virtual host of the first virtual structure to be migrated is exported by the first operation environment device 1 as an OVF folder, the OVF folder includes the initial-resources of the virtual host of the first virtual structure, and then the driver file (VM ware Tools) in the system resource of the initial-resources is uninstalled to derive the resources of the virtual host of the first virtual structure. The first operation environment device 1 transmits the resources of the virtual host of the first virtual structure to the migration device 3. The resources may include a storage resource and a system resource.

The second operation environment device 2 starts the file container corresponding to a system disk based on the virtualization of the virtual host of the second virtual structure, and specifies a virtio file to facilitate loading the driver of the virtual host of the second virtual structure after logging in the system.

After the system disk of the second operation environment device 2 is started, the system is logged in. The second operation environment device 2 loads a driver file for installing the virtual host of the second virtual structure. For example, the driver file of the virtual host of the second virtual structure includes a network file, a storage file, and the like. The second operation environment device 2 then shuts down the system.

The migration device 3 converts the resources of the virtual host of the first virtual structure into a file container and transmits the file container to the storage pool 4. The migration device 3 can convert the storage resource into a storage file container and convert the system resource into the system file container.

The second operation environment device 2 reads a configuration file of the virtual host of the first virtual structure, and creates an empty storage corresponding to the configuration file in the virtual host of the second virtual structure.

The second operation environment device 2 exports the file container from the storage pool 4 and replaces the empty storage with the file container to load the virtual host of the second virtual structure. So far, the migration of the virtual host from the first operation environment device 1 to the second operation environment device 2 is completed.

In the technical solution of the virtual host migration system provided by this embodiment, the first operation environment device is loaded with the virtual host of the first virtual structure, and the second operation environment device acquires the file container acceptable by the second operation environment device and loads the virtual host of the second virtual structure according to the file container, realizing virtual host migration across platforms. The present disclosure can help enterprise users to realize business migration more quickly and respond to business needs in time.

Figure 3:
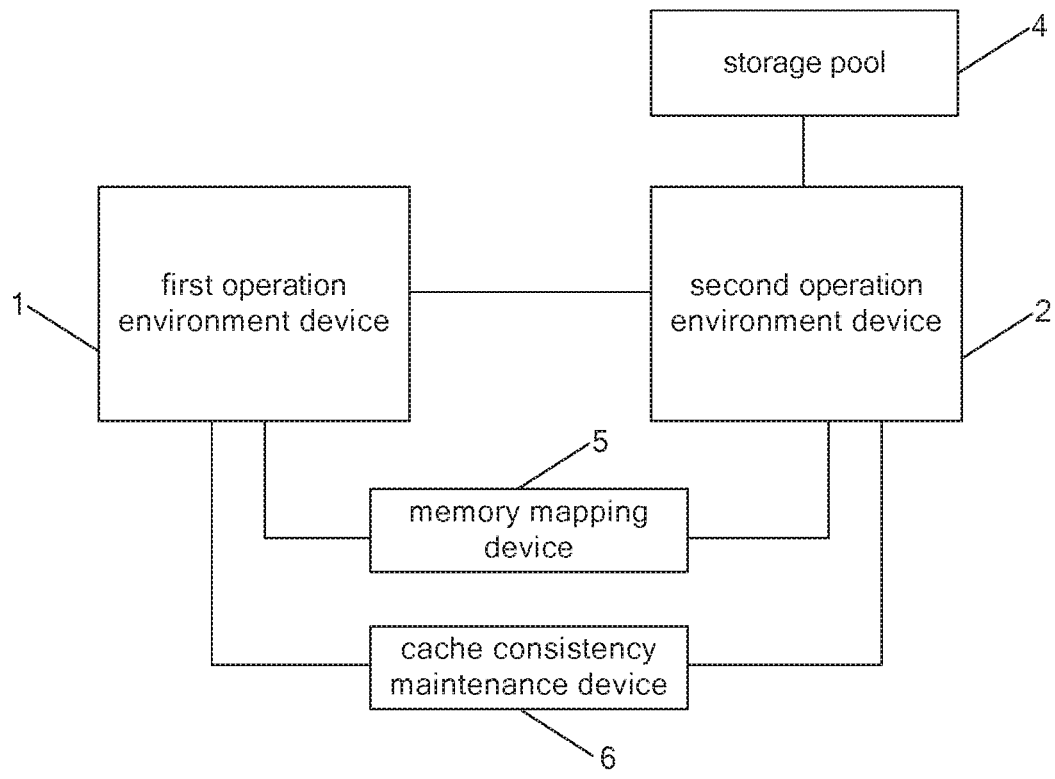
FIG. 3 is a schematic structural diagram of a virtual host migration system according to further another embodiment of the present disclosure.

FIG. 3 is a schematic structural diagram of a virtual host migration system according to another embodiment of the present disclosure. As shown in FIG. 3, the virtual host migration system includes a first operation environment device 1 and a second operation environment device 2. The first operation environment device 1 is configured to transmit resources of a virtual host of a first virtual structure to the second operation environment device 2. The second operation environment device 2 is configured to convert the resources of the virtual host of the first virtual structure into a file container acceptable by the second operation environment device 2, and load the virtual host of the second virtual structure according to the file container.

In some implementations, the virtual host migration system further includes a storage pool 4. The second operation environment device 2 is configured to transmit the file container to the storage pool 4. The storage pool 4 is configured to store the file container. The second operation environment device 2 is configured to export the file container from the storage pool 4 to realize migration of the file container to the second operation environment device 2. In some implementations, the storage pool 4 is a Ceph storage pool.

In some implementations, the first operation environment device 1 and the second operation environment device 2 are different cloud platforms. In some implementations, the first operation environment device 1 may be ESXi, and the second operation environment device 2 may be OpenStack. Accordingly, the virtual host of the first virtual structure may be VMware, and the virtual host of the second virtual structure may be Xen or KVM, the resources of the virtual host of the first virtual structure may be a VMDK file, and the format of the file container acceptable by the second operation environment device is RAW, and the file container is a RAW file.

In some implementations, the resources include a storage resource and a system resource, the file container includes a storage file container and a system file container. The first operation environment device 1 is configured to transmit the storage resource and the system resource to the second operation environment device 2. The second operation environment device 2 is configured to convert the storage resource into a storage file container acceptable by the second operation environment device 2 and to convert the system resource into a system file container acceptable by the second operation environment device 2.

In some implementations, the second operation environment device 2 is configured to read a configuration file of the virtual host of the first virtual structure, create an empty storage corresponding to the configuration file in the virtual host of the second virtual structure, and replaces the empty storage with the file container exported from the storage pool 4, to load the virtual host of the second virtual structure. Specifically, the second operation environment device 2 includes a space pre-allocation component (not specifically shown in the figure), and the space pre-allocation component is configured to read the configuration file of the virtual host of the first virtual structure, and create the empty storage corresponding to the configuration file in the virtual host of the second virtual structure, and replace the empty storage with the file container exported from the storage pool 4.

In some implementations, the virtual host migration system further includes a memory mapping device 5. The memory mapping device 5 is configured to map a memory page of the virtual host of the first virtual structure into a memory of the virtual host of the second virtual structure. During the migration process of the virtual host, the memory mapping device 5 can map the memory page of the virtual host of the first virtual structure into the memory of the virtual host of the second virtual structure in real time until the migration ends, thereby realizing migration of the virtual host without downtime. Since the mapping of the memory page is performed by the memory mapping device 5 isolated from the first operation environment device 1 and the second operation environment device 2, it is ensured that the user cannot perceive any interruption throughout the migration process.

In some implementations, the virtual host migration system further includes a cache consistency maintenance device 6. The cache consistency maintenance device 6 is configured to synchronize cache data generated by the first operation environment device 1 during the migration process into the second operation environment device 2. Since the synchronization of the cache data is performed by the cache consistency maintenance device 6 isolated from the first operation environment device 1 and the second operation environment device 2, it is ensured that the user cannot perceive any interruption throughout the migration process.

In some implementations, the first operation environment device 1 is further configured to de-characterize initial resources of the virtual host of the first virtual structure to derive the resources. The initial-resources include a storage resource and a system resource, and the resources include a storage resource and a system resource, and the first operation environment device 1 de-characterizes the system resource of the initial-resources to derive the system resource in the resources, generates the resources based on the storage resource in the initial-resources and the system resource in the resources derived by above de-characterization. Specifically, the first operation environment device 1 may uninstall the driver file in the system resource of the initial-resources to implement de-characterization of the system resource of the initial-resources.

In some implementations, the virtual host is a virtual host running in a cloud environment.

The migration process of the virtual host will be described below by using a specific example. In this example, the first operation environment device 1 is ESXi, and the second operation environment device 2 is OpenStack. The resources of the virtual host of the first virtual structure may be the VMDK file, the file container acceptable by the second operation environment device 2 is a RAW file.

The first operation environment device 1 is logged in, the virtual host of the first virtual structure to be migrated is exported by the first operation environment device 1 as an OVF folder, the OVF folder includes an initial resource of the virtual host of the first virtual structure, and then the driver file (VM ware Tools) in the system resources of the initial-resources is uninstalled to derive the resources of the virtual host of the first virtual structure. The first operation environment device 1 transmits the resources of the virtual host of the first virtual structure to the second operation environment device 2. For example, the resources of the virtual host of the first virtual structure can be transmitted to a computing node of the second operation environment device 2. The resources may include a storage resource and a system resource.

The second operation environment device 2 converts the resources of the virtual host of the first virtual structure into a file container. Specifically, the resources of the virtual host of the first virtual structure may be converted into the file container by the computing node of the second operation environment device 2.

The second operation environment device 2 starts the file container corresponding to a system disk based on the virtualization of the virtual host of the second virtual structure, and specifies a virtio file to facilitate to load the driver of the virtual host of the second virtual structure after logging in the system.

After the system disk of the second operation environment device 2 is started, the system is logged in. The second operation environment device 2 loads a driver file for installing the virtual host of the second virtual structure. For example, the driver file of the virtual host of the second virtual structure includes a network file, a storage file, and the like. The second operation environment device 2 then shuts down the system.

The second operation environment device 2 transmits the file container to the storage pool 4.

The second operation environment device 2 reads a configuration file of the virtual host of the first virtual structure, and creates an empty storage corresponding to the configuration file in the virtual host of the second virtual structure.

The second operation environment device 2 exports the file container from the storage pool 4 and replaces the empty storage with the file container to implement loading of the virtual host of the second virtual structure. So far, the migration of the virtual host from the first operation environment device 1 to the second operation environment device 2 is completed.

In the technical solution of the virtual host migration system provided by this embodiment, the first operation environment device is loaded with the virtual host of the first virtual structure, and the second operation environment device acquires the file container acceptable by the second operation environment device and loads the virtual host of the second virtual structure according to the file container, realizing virtual host migration across platforms. The present disclosure can help enterprise users to realize business migration more quickly and respond to business needs in time.

Figure 4:
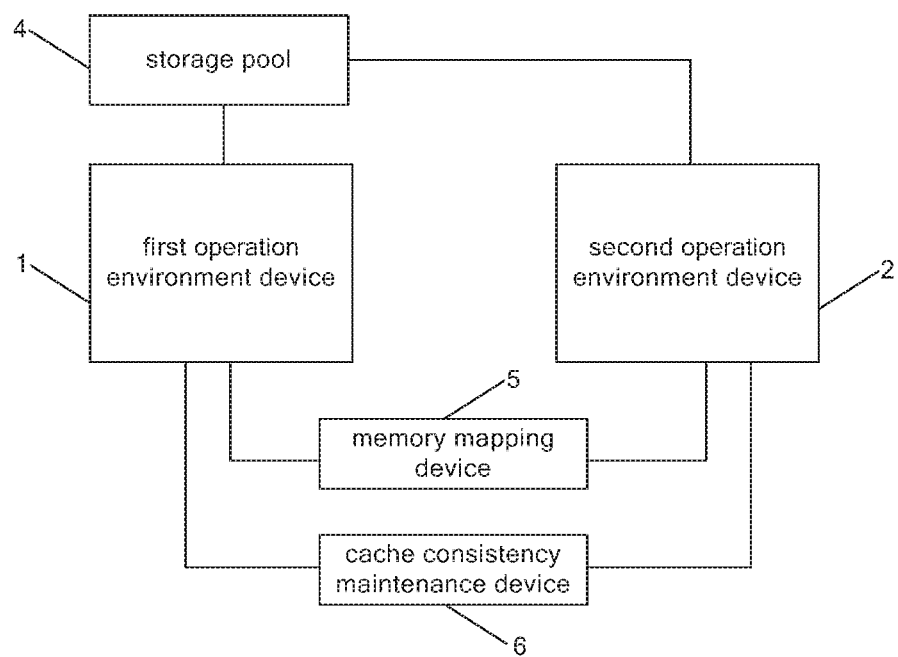
FIG. 4 is a schematic structural diagram of a virtual host migration system according to still another embodiment of the present disclosure.

FIG. 4 is a schematic structural diagram of a virtual host migration system according to another embodiment of the present disclosure. As shown in FIG. 4, the virtual host migration system includes a first operation environment device 1 and a second operation environment device 2. The first operation environment device 1 is configured to convert resources of the virtual host of the first virtual structure into a file container acceptable by the second operation environment device 2, and transmit the file container acceptable by the second operation environment device 2 to the second operation environment device 2. The second operation environment device 2 is configured to load the virtual host of the second virtual structure according to the file container.

In some implementations, the virtual host migration system further includes a storage pool 4. The second operation environment device 2 is configured to transmit the file container to the storage pool 4. The storage pool 4 is configured to store the file container. The second operation environment device 2 is configured to export the file container from the storage pool 4 to realize migration of the file container to the second operation environment device 2. In some implementations, the storage pool 4 is a Ceph storage pool.

In some implementations, the first operation environment device 1 and the second operation environment device 2 are different cloud platforms. In some implementations, the first operation environment device 1 may be OpenStack, and the second operation environment device 2 may be ESXi. Accordingly, the virtual host of the first virtual structure may be Xen or KVM, and the virtual host of the second virtual structure may be VMware. In such case, the resources of the virtual host of the first virtual structure may be a RAW file, and the format of the file container acceptable by the second operation environment device 2 is VMDK, and the container file is a VMDK file.

In some implementations, the resources include a storage resource and a system resource, the file container includes a storage file container and a system file container. The first operation environment device 1 is configured to convert the storage resource into a storage file container acceptable by the second operation environment device 2, and convert the system resource into a system file container acceptable by the second operation environment device 2, and transmit the storage file container acceptable by the operation environment device 2 and the system file container acceptable by the second operation environment device 2 to the second operation environment device 2.

In some implementations, the second operation environment device 2 is configured to read a configuration file of the virtual host of the first virtual structure, create an empty storage corresponding to the configuration file in the virtual host of the second virtual structure, and replaces the empty storage with the file container exported from the storage pool 4, to load the virtual host of the second virtual structure. Specifically, the second operation environment device 2 includes a space pre-allocation component (not specifically shown in the figure), and the space pre-allocation component is configured to read the configuration file of the virtual host of the first virtual structure, and create the empty storage corresponding to the configuration file in the virtual host of the second virtual structure, and replace the empty storage with the file container exported from the storage pool 4.

In some implementations, the virtual host migration system further includes a memory mapping device 5. The memory mapping device 5 is configured to map a memory page of the virtual host of the first virtual structure into a memory of the virtual host of the second virtual structure. During the migration process of the virtual host, the memory mapping device 5 can map the memory page of the virtual host of the first virtual structure into the memory of the virtual host of the second virtual structure in real time until the migration ends, thereby realizing migration of the virtual host without downtime. Since the mapping of the memory page is performed by the memory mapping device 5 isolated from the first operation environment device 1 and the second operation environment device 2, it is ensured that the user cannot perceive any interruption throughout the migration process.

In some implementations, the virtual host migration system further includes a cache consistency maintenance device 6. The cache consistency maintenance device 6 is configured to synchronize cache data generated by the first operation environment device 1 during the migration process into the second operation environment device 2. Since the synchronization of the cache data is performed by the cache consistency maintenance device 6 isolated from the first operation environment device 1 and the second operation environment device 2, it is ensured that the user cannot perceive any interruption throughout the migration process.

In some implementations, the first operation environment device 1 is configured to de-characterize initial-resources of the virtual host of the first virtual structure to derive the resources. The initial-resources include a storage resource and a system resource, and the resources include a storage resource and a system resource, and the first operation environment device 1 de-characterizes the system resource of the initial-resources to derive the system resource in the resources, generates the resources based on the storage resource in the initial-resources and the system resource in the resources derived by above de-characterization. Specifically, the first operation environment device 1 may uninstall the driver file in the system resource of the initial-resources to implement de-characterization of the system resource of the initial-resources.

In some implementations, the virtual host is a virtual host running in a cloud environment.

The migration process of the virtual host will be described below by using a specific example. In this example, the first operation environment device 1 is OpenStack, and the second operation environment device 2 is ESXi. The resources of the virtual host of the first virtual structure may be a RAW file, and the file container acceptable by the second operation environment device may be a VMDK file.

The first operation environment device 1 is logged in, the virtual host of the first virtual structure to be migrated is exported by the first operation environment device 1 as an OVF folder, the OVF folder includes initial-resources of the virtual host of the first virtual structure, and then the driver file (VM ware Tools) in the system resource of the initial-resources is uninstalled to derive the resources of the virtual host of the first virtual structure. The first operation environment device 1 converts the resources of the virtual host of the first virtual structure into a file container and transmits the file container to the storage pool 4. The resources may include a storage resource and a system resource.

The second operation environment device 2 starts the file container corresponding to a system disk based on the virtualization of the virtual host of the second virtual structure, and specifies a virtio file to facilitate to load the driver of the virtual host of the second virtual structure after logging in to the system.

After the system disk of the second operation environment device 2 is started, the system is logged in. The second operation environment device 2 loads a driver file for installing the virtual host of the second virtual structure. For example, the driver file of the virtual host of the second virtual structure includes a network file, a storage file, and the like. The second operation environment device 2 then shuts down the system.

The second operation environment device 2 reads a configuration file of the virtual host of the first virtual structure, and creates an empty storage corresponding to the configuration file in the virtual host of the second virtual structure.

The second operation environment device 2 exports the file container from the storage pool 4 and replaces the empty storage with the file container to load the virtual host of the second virtual structure. So far, the migration of the virtual host from the first operation environment device 1 to the second operation environment device 2 is completed.

In the technical solution of the virtual host migration system provided by this embodiment, the first operation environment device is loaded with the virtual host of the first virtual structure, and the second operation environment device acquires the file container acceptable by the second operation environment device and loads the virtual host of the second virtual structure according to the file container, realizing virtual host migration across platforms. The present disclosure can help enterprise users to realize business migration more quickly and respond to business needs in time.

Figure 5:
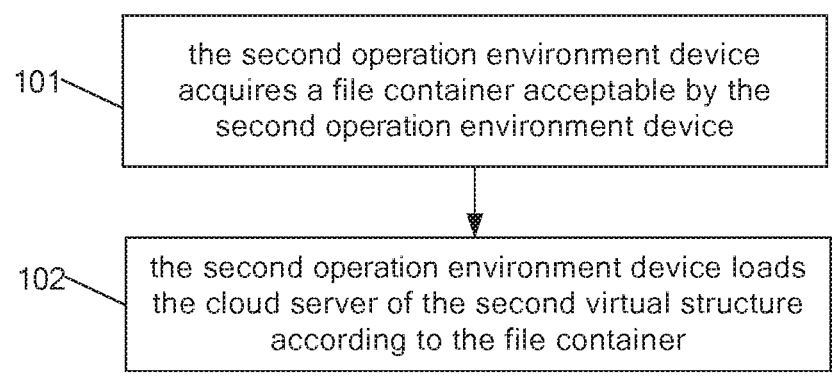
FIG. 5 is a flowchart of a virtual host migration method according to an embodiment of the present disclosure.

FIG. 5 is a flowchart of a virtual host migration method according to an embodiment of the present disclosure. As shown in FIG. 5, the virtual host migration method is based on a virtual host migration system. The virtual host migration system at least includes a first operation environment device and a second operation environmental device, the first operation environment device is loaded with a virtual host of a first virtual structure, the method includes steps 101 and 102.

At the step 101, the second operation environment device acquires a file container acceptable by the second operation environment device.

As a first solution for implementing the step 101, the virtual host migration system further includes a migration device, and the step 101 includes: the first operation environment device transmits resources of the virtual host of the first virtual structure to the migration device; the migration device converts the resources of the virtual host of the first virtual structure into a file container acceptable by the second operation environment device, and migrates the file container acceptable by the second operation environment device to the second operation environment device. Further, before the first operation environment device transmits the resources of the virtual host of the first virtual structure to the migration device, the method further includes: de-characterizing, by the first operation environment device, initial-resources of the first virtual host of the first virtual structure to derive the resources. In this case, the virtual host migration method can be implemented by the virtual host system provided by the embodiment described with reference to FIG. 1 or FIG. 2.

As a second implementation of the step 101, the step 101 includes: the first operation environment device transmits resources of the virtual host of the first virtual structure to the second operation environment device; and the second operation environment device converts the resources into a file container acceptable by the second operation environment device. Further, before the first operation environment device transmits the resources of the virtual host of the first virtual structure to the second operation environment device, the method further includes: de-characterizing, by the first operation environment device, the initial-resources of the virtual host of the first virtual structure to derive the resources. In this case, the virtual host migration method can be implemented by the virtual host migration system provided by the embodiment described with reference to FIG. 1 or FIG. 3.

As a third solution for implementing the step 101, the step 101 includes: the first operation environment device converts resources of the virtual host of the first virtual structure into a file container acceptable by the second operation environment device, and transmits the file container acceptable by the second operation environment device to the second operation environment device. Further, before the first operation environment device converts the resources of the virtual host of the first virtual structure into the file container acceptable by the second operation environment device, the method further includes: de-characterizing, by the first operation environment device, initial-resources of the virtual host of the first virtual structure to derive the resources. In this case, the virtual host migration method can be implemented by the virtual host system provided by the embodiment described with reference to FIG. 1 or FIG. 4.

At the step 102, the second operation environment device loads the virtual host of the second virtual structure according to the file container.

The step 102 includes: the second operation environment device reads a configuration file of the virtual host of the first virtual structure, creates an empty storage corresponding to the configuration file in the virtual host of the second virtual structure, and replaces the empty storage with the file container to implement loading of a virtual host of a second virtual structure.

In the technical solution of the virtual host migration method provided by this embodiment, the first operation environment device is loaded with the virtual host of the first virtual structure, and the second operation environment device acquires the file container acceptable by the second operation environment device and loads the virtual host of the second virtual structure according to the file container, realizing virtual host migration across platforms. The present disclosure can help enterprise users to realize business migration more quickly and respond to business needs in time.

An embodiment of the present disclosure provides a computer apparatus including: at least one processor and a memory. The memory is configured to store at least one program; when the at least one program are executed by the at least one processor, causing the at least one processor to implement a virtual host migration method. The virtual host migration method may be the above virtual host migration method.

In the technical solution of the computer apparatus provided by this embodiment, the virtual host migration method provided by the embodiment of the present disclosure is achieved, the first operation environment device is loaded with the virtual host of the first virtual structure, and the second operation environment device acquires the file container acceptable by the second operation environment device and loads the virtual host of the second virtual structure according to the file container, realizing virtual host migration crossing platforms. The present disclosure can help enterprise users to realize business migration more quickly and respond to business needs in time.

An embodiment of the present disclosure provides a computer readable storage medium having stored thereon computer instructions that, when executed, perform a virtual host migration method. The virtual host migration method may be the above virtual host migration method.

In the technical solution of the computer readable storage medium provided by this embodiment, the virtual host migration method provided by the embodiment of the present disclosure is achieved, the first operation environment device is loaded with the virtual host of the first virtual structure, and the second operation environment device acquires the file container acceptable by the second operation environment device and loads the virtual host of the second virtual structure according to the file container, realizing virtual host migration across platforms. The present disclosure can help enterprise users to realize business migration more quickly and respond to business needs in time. It should be understood that, the foregoing embodiments and implementations are only exemplary embodiments and implementations used for explaining the principle of the present disclosure, but the present disclosure is not limited thereto. Various variations and modifications may be made by a person skilled in the art without departing from the spirit and essence of the present disclosure, and these variations and improvements also fall into the protection scope of the present disclosure.

The invention claimed is:

1. A virtual host migration system, comprising: a first operation environment device and a second operation environment device, wherein the first operation environment device is loaded with a virtual host of a first virtual structure;
   the second operation environment device is configured to acquire a file container acceptable by the second operation environment device, and load a virtual host of a second virtual structure according to the file container,
   further comprising: a migration device coupled to the first operation environment device and the second operation environment device, wherein
   the first operation environment device is configured to transmit resources of the virtual host of the first virtual structure to the migration device;
   the migration device is configured to convert the resources of the virtual host of the first virtual structure into a file container acceptable by the second operation environment device, and migrate the file container acceptable by the second operation environment device to the second operation environment device,
   wherein the resources comprise a storage resource and a system resource, the file container comprises a storage file container and a system file container, and the migration device comprises a storage migration device and a system migration device, wherein
   the storage migration device is further configured to convert the storage resource into a storage file container acceptable by the second operation environment device, and migrate the storage file container to the second operation environment device;
   the system migration device is further configured to convert the system resource into a system file container acceptable by the second operation environment device, and migrate the system file container to the second operation environment device.

2. The virtual host migration system of claim 1, further comprising: a storage pool, wherein
   the migration device is further configured to transmit the file container to the storage pool;
   the storage pool is further configured to store the file container; and
   the second operation environment device is further configured to export the file container from the storage pool.

3. The virtual host migration system of claim 2, wherein the second operation environment device comprises a space pre-allocation component;
the space pre-allocation component is configured to read a configuration file of the virtual host of the first virtual structure, create an empty storage corresponding to the configuration file in the virtual host of the second virtual structure, and replace the empty storage with the file container exported from the storage pool, to load the virtual host of the second virtual structure.

4. The virtual host migration system of claim 1, further comprising: a memory mapping device, which is configured to map a memory page of the virtual host of the first virtual structure into a memory of the virtual host of the second virtual structure.

5. The virtual host migration system of claim 1, further comprising a cache consistency maintenance device, which is configured to synchronize cache data generated by the first operation environment device in the migration process to the second operation environment device.

6. The virtual host migration system of claim 1, wherein the virtual host is a virtual host running in a cloud environment.

7. A virtual host migration method based on a virtual host migration system, the virtual host migration system at least comprising a first operation environment device and a second operation environment device, the first operation environment device is loaded with a virtual host of a first virtual structure,
the virtual host migration method comprises:
acquiring, by the second operation environment device, a file container acceptable by the second operation environment device; and
loading, by the second operation environment device, a virtual host of a second virtual structure according to the file container,
wherein the virtual host migration system further comprises a migration device, and the step of acquiring, by the second operation environment device, the file container acceptable by the second operation environment device further comprises:
transmitting, by the first operation environment device, resources of the virtual host of the first virtual structure to the migration device;
converting, by the migration device, the resources of the virtual host of the first virtual structure into the file container acceptable by the second operation environment device, and migrating, by the migration device, the file container acceptable by the second operation environment device to the second operation environment device, and
wherein the resources comprise a storage resource and a system resource, the file container comprises a storage file container and a system file container, and the migration device comprises a storage migration device and a system migration device, wherein the converting, by the migration device, the resources of the virtual host of the first virtual structure into the file container acceptable by the second operation environment device, and migrating, by the migration device, the file container acceptable by the second operation environment device to the second operation environment device further comprises:
converting, by the migration device, the storage resource into a storage file container acceptable by the second operation environment device, and migrating, by the migration device, the storage file container to the second operation environment device; and
converting, by the system migration device, the system resource into a system file container acceptable by the second operation environment device, and migrating, by the system migration device, the system file container to the second operation environment device.

8. The virtual host migration method of claim 7, wherein the step of loading, by the second operation environment device, the virtual host of the second virtual structure according to the file container further comprises:
reading, by the second operation environment device, a configuration file of the virtual host of the first virtual structure;
creating, by the second operation environment device, an empty storage corresponding to the configuration file in the virtual host of the second virtual structure; and
replacing, by the second operation environment device, the empty storage with the file container to load the virtual host of the second virtual structure.

9. A computer apparatus, comprising:
at least one processor;
a memory configured to store at least one program;
the at least one program is executed by the at least one processor such that the at least one processor implement the virtual host migration method of claim 7.

10. A computer apparatus comprising:
at least one processor;
a memory configured to store at least one program;
the at least one program are executed by the at least one processor such that the at least one processor implement the virtual host migration method of claim 8.

11. A non-transitory readable storage medium storing computer instructions, wherein the computer instructions are executed to execute the virtual host migration method of claim 7.

* * * * *